United States Patent [19]
Marten

[11] Patent Number: 5,392,440
[45] Date of Patent: Feb. 21, 1995

[54] CIRCUIT ARRANGEMENT FOR OPERATING A COMPUTER HAVING A READBACK DEVICE FOR FEEDING BACK LAST-WRITTEN INFORMATION TO THE COMPUTER

[75] Inventor: Peter Marten, Heidelberg, Germany

[73] Assignee: Heidelberger Druckmaschinen AG, Heidelberg, Germany

[21] Appl. No.: 877,858

[22] Filed: May 4, 1992

[30] Foreign Application Priority Data

May 4, 1991 [DE] Germany ................................ 4114545

[51] Int. Cl.⁶ .............................................. G06F 13/00
[52] U.S. Cl. ...................................... 395/775; 395/425; 364/951; 364/964.6; 364/DIG. 2
[58] Field of Search ................ 395/200, 250, 375, 400, 395/425, 275, 500, 775

[56] References Cited

U.S. PATENT DOCUMENTS 4,954,988  9/1990  Robb .
5,113,516  5/1992  Johnson ................................ 395/500

FOREIGN PATENT DOCUMENTS 58-114258  7/1983  Japan .
63-020545  1/1988  Japan .
2281341  11/1990  Japan .
3085658  4/1991  Japan .

OTHER PUBLICATIONS

"Halbleiter-Schaltungstechnik" (Advanced Electronic Circuits), Tietze/Schenk, 9th Edition, p. 678ff.
"Build a Microcomputer" Chapter III The Data Path, pp. 7-14.

*Primary Examiner*—Robert L. Richardson
*Attorney, Agent, or Firm*—Herbert L. Lerner; Laurence A. Greenberg

[57] ABSTRACT

A circuit arrangement for operating a computer, having at least one working register into which and out of which information, under specific addresses, can be read, and a readback device for a feedback occurring in a program step whereby the last-written information is fed back to a processor of the computer. The circuit arrangement includes at least one feedback register to which the working register is assigned. A device is provided for writing the respective information under the same address both to the working register and also to the feedback register for storage therein and for writing new information. A device forwards the information stored in the feedback register to the processor.

8 Claims, 3 Drawing Sheets

CIRCUIT ARRANGEMENT FOR OPERATING A COMPUTER HAVING A READBACK DEVICE FOR FEEDING BACK LAST-WRITTEN INFORMATION TO THE COMPUTER

The invention relates to a circuit arrangement for the operation of a computer, particularly a microcomputer having at least one working register, into which and again out of which information, under specific addresses, can be read, and a readback device for a feedback occurring in a program step, whereby the last-written information is fed back to a processor of the computer.

It has become known heretofore to provide microcomputers with so-called peripheral devices (in this regard, reference is made to the technical book "Halbleiter-Schaltungstechnik" ("Advanced Electronic Circuits"), Tietze/Schenk, 9th edition, p. 678ff). Such peripheral devices include registers or the like in which information (data) is stored under specific addresses. A microprocessor (CPU) of a microcomputer is connected to a register by its address lines. If a write command exists, for example, and a specific address of the register is selected, then the data are stored under that address. In the course of the execution of a program, if an address of the register is activated in a further program step, it may then be that only one bit changes in the information, which may, for example, consist of an eight-bit word, with the remaining seven bits retaining their previous state. This presupposes, when the data are written under that address, that the state of the individual bits of the data is known to the processor of the microcomputer.

When heretofore known peripheral devices employ registers which do not read back, the information must be stored not only in the peripheral device (register), but also, via a second access step by the microprocessor, in a static or dynamic memory, particularly a RAM (Random Access Memory). If the peripheral device has D flip-flop latches, then, parallel to the outputs of the D flip-flop latches, tri-state switchable data drivers are reconnected to an internal data bus, due to which it is possible to read back the current data value. Because of the repeated accessing, these heretofore known constructions operate relatively slowly and are, furthermore, relatively elaborate and associated with corresponding costs.

It is accordingly an object of the invention, therefore, to provide a circuit arrangement for operating a computer which operates rapidly and is low in cost.

With the foregoing and other objects in view, there is provided, in accordance with the invention, a circuit arrangement for operating a computer, having at least one working register into and again out of which information, under specific addresses, can be read, and a readback device for a feedback occurring in a program step whereby the last-written information is fed back to a processor of the computer, comprising at least one feedback register to which the working register is assigned, means for writing the respective information under the same address both to the working register and also to the feedback register for storage therein and for writing new information, means for forwarding the information stored in the feedback register to the processor. Due to the additional feedback register, which may be referred to as a so-called "shadow register", it is possible to store the information under the same or like address both in the working register, as well as in the "shadow register". In accordance with the invention, "address mirroring" occurs, that is, when written, the information passes to the working register and, simultaneously, under an "outwardly" identical address, into a special memory region, namely the feedback register. For this purpose, the address of the working register is, preferably, automatically converted internally into a permanently assigned feedback-register address. Therefore, if a specific address of the working register is selected, the shadow register is automatically accessed under a different, however, only internally used address, with the result that the information is written, in a respectively mutually fixed address assignment or constellation, both to the working register, as well as to the shadow register, wherein only the address of the working register then appears "outwardly", however. Consequently, an additional accessing step by the microprocessor is not required for the capability of reading back.

The assignment of the addresses of the working register and the feedback register, for example, provides for addresses 500 to 600 of the feedback register to be permanently assigned, for example, to addresses 1000 to 1100 of the working register. Thus, for example, if address 1000 of the working register is selected by the processor then, according to the invention, an internal selection of address 500 occurs simultaneously. If a selection of address 1001 of the working register then occurs in a further program step, address 501 of the feedback register is automatically also selected. The execution of the program itself, however, does not take into account the internal addresses of the feedback register, but only the "outward" addresses of the working register, so that a complex program structure is unnecessary due to the construction according to the invention.

The address mirroring according to the invention requires just a single access step by the microprocessor, with the result that the program is able to be executed at high speed, it being possible, preferably, to employ standard modules or components as peripheral devices. Elaborate special modules of the type heretofore required in the prior art, are not required. The assignment of the working-register address to the feedback-register address can be implemented by very simple means.

In accordance with another feature of the invention, the feedback register is in the form of a random access memory. In principle, all information-storing means are conceivable as feedback registers.

In accordance with a further feature of the invention, the random access memory is a constituent part of the computer.

Because a microcomputer usually has a RAM (Random Access Memory), only a few additional components are required, the same RAM being usable when configuring the circuit arrangement according to the invention.

In accordance with an added feature of the invention, there is provided a logic device for permitting, through an allocation logic of the logic device, simultaneous accessing of the working register and the feedback register under the same address.

In accordance with an additional feature of the invention, the logic device is in the form of a discrete hardware circuit.

In accordance with still another feature of the invention, the logic device is a programmable logic device.

In accordance with still a further feature of the invention, there is provided at least one peripheral device having at least one register which is only partially capable of read back, the working register being formed of a region of the one register which is not capable of read back, and wherein the feedback register is formed of a region of the one register which is capable of read back.

In accordance with a concomitant feature of the invention, there are provided means for reading back or not reading back, respectively, of an individual data bit or a plurality of data bits.

Other features which are considered as characteristic for the invention are set forth in the appended claims.

Although the invention is illustrated and described herein as embodied in a circuit arrangement for operating a computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
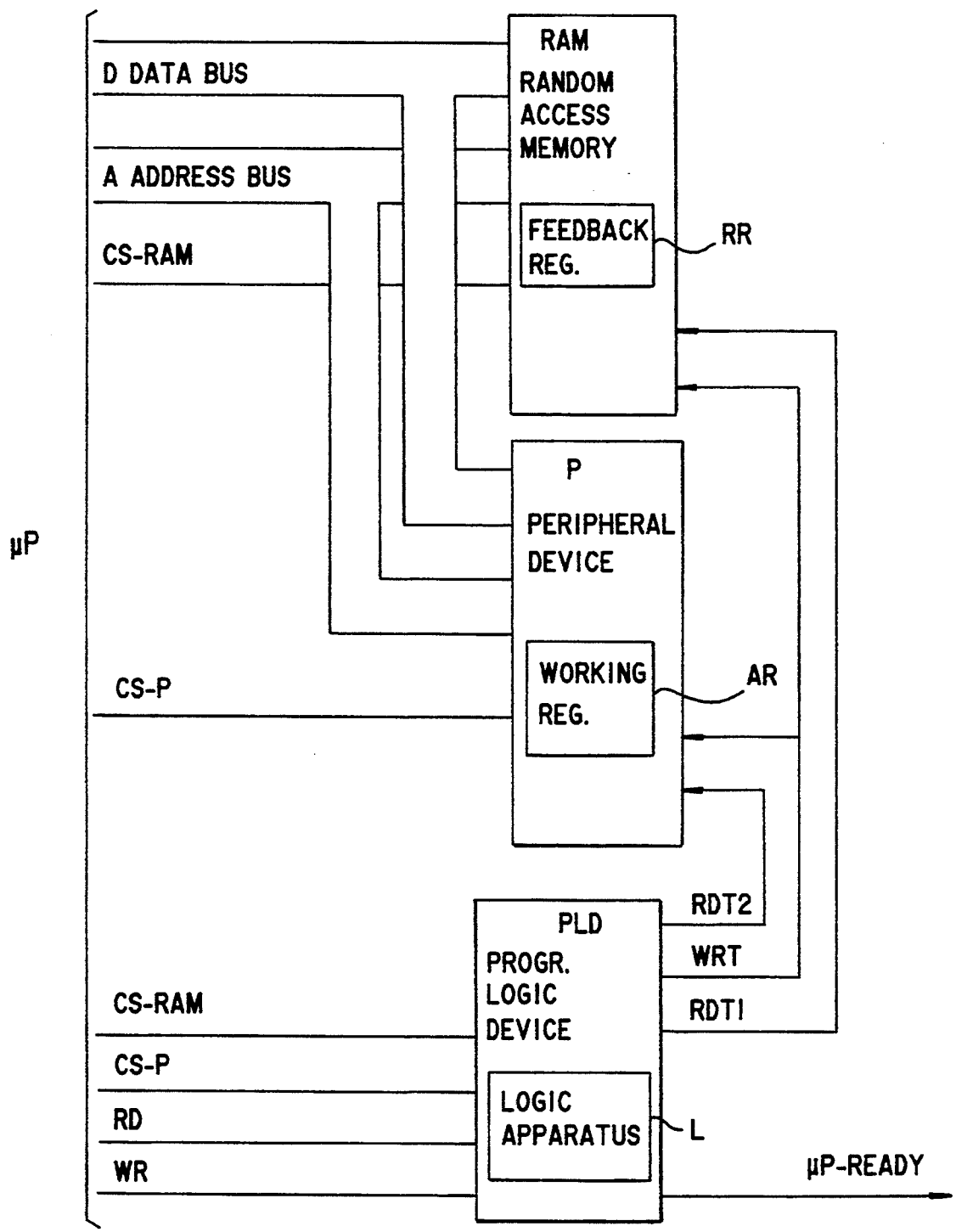
FIG. 1 is a block diagram of a first embodiment of the circuit arrangement according to the invention.

Referring now to the drawings and, first, particularly, to FIG. 1 thereof, a microcomputer or microprocessor $\mu P$ (not otherwise illustrated) is connected via a data bus D and an address bus A to a RAM and to a peripheral device P. In order to activate the RAM and the peripheral device P, chip-select lines CS-RAM are provided for the RAM and CS-P for the peripheral device P. When these lines are selected, the corresponding device goes into action. Also provided is a logic apparatus L, which is in the form of a PLD (Programmable Logic Device). Chip-select lines CS-RAM and CS-P lead to the PLD. Also leading to the PLD are a read-command line RD and a write-command line WR.

The peripheral device P has a working register AR, and the RAM has a feedback register RR. The PLD is connected to the peripheral device P via a line RDT2. It is possible to produce a PLD-generated read signals for the peripheral device P on the line RDT2. A line WRT is further provided, which connects the PLD to the peripheral device P and to the RAM. On the line WRT, it is possible to produce a PLD-generated write signal. Finally, the PLD is connected to the RAM via a line RDT1, which serves to feed a PLD-generated read signal to the RAM. A line $\mu P$-READY is also provided, which issues a ready signal when data transfer is completed, so that the data no longer have to be applied.

The circuit arrangement according to FIG. 1 operates as follows:

A specific item of information (e.g. an 8-bit word) is assumed to be stored in the working register AR of the peripheral device. The information is stored likewise in an associated shadow register, namely the feedback register RR of the RAM. If, in a further program step, it is then intended to store a new item of information in the working register AR of the peripheral device P, the PLD is initially activated by the microprocessor $\mu P$, so that the PLD generates a read signal on the line RDT1, due to which the information is read from the feedback register RR of the RAM and is made available to the microprocessor $\mu P$. The microprocessor $\mu P$, consequently, receives knowledge of the previous state. If a new item of information is then written via the address bus A to the working register AR of the peripheral device P, the new item of information is also stored simultaneously in the feedback register RR of the RAM under a corresponding assigned internal address. This information is supplied via the data bus D to the appropriate devices, with the previously read-out old information also being taken into account. If, therefore, only one bit of the S-bit data word, for example, is changed in the new item of information as compared with the old item of information, then the states of the other 7 bits are retained, because they are known through the previous read operation. To write the information, the microprocessor $\mu P$ generates a write signal on the line WR. This write signal is converted by the PLD into a PLD-generated write signal, which is forwarded via the line WRT both to the RAM as well as to the peripheral device P.

The aforedescribed embodiment of the invention assumes that the RAM is a constituent part of the microcomputer. However, in accordance with another embodiment of the invention, it is also possible, according to FIG. 1, to provide the peripheral device with a register containing a working register AR and a feedback register RR. Only in such a case is the line RDT2 required in order to read the contents of the feedback register RR.

Figure 2:
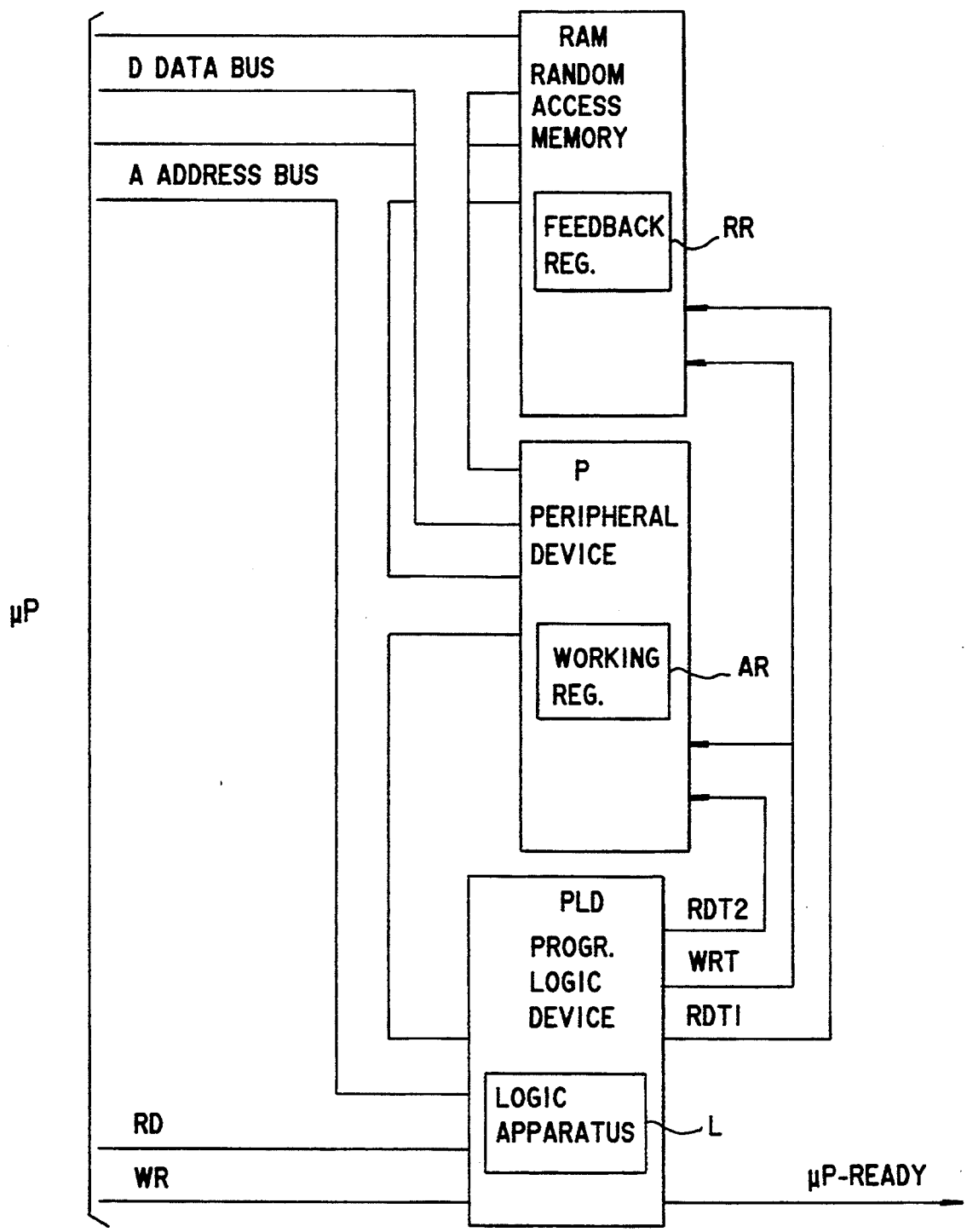
FIG. 2 is a block diagram of a second embodiment of the circuit arrangement according to the invention.

FIG. 2 illustrates an embodiment of the circuit arrangement which differs from that of FIG. 1 in that the address bus A leads both to the RAM as well as to the peripheral device P and, moreover, also to the PLD. Within a specified address region, assurance is provided that, when information is written, it is written to both the RAM (feedback register RR) as well as to the working register AR of the peripheral device P. In this case, again, the RAM of the microcomputer may be used or the register of the peripheral device may be provided with both the working register AR as well as the feedback register RR. A line RDT2 is either required or not required, accordingly.

Figure 3:
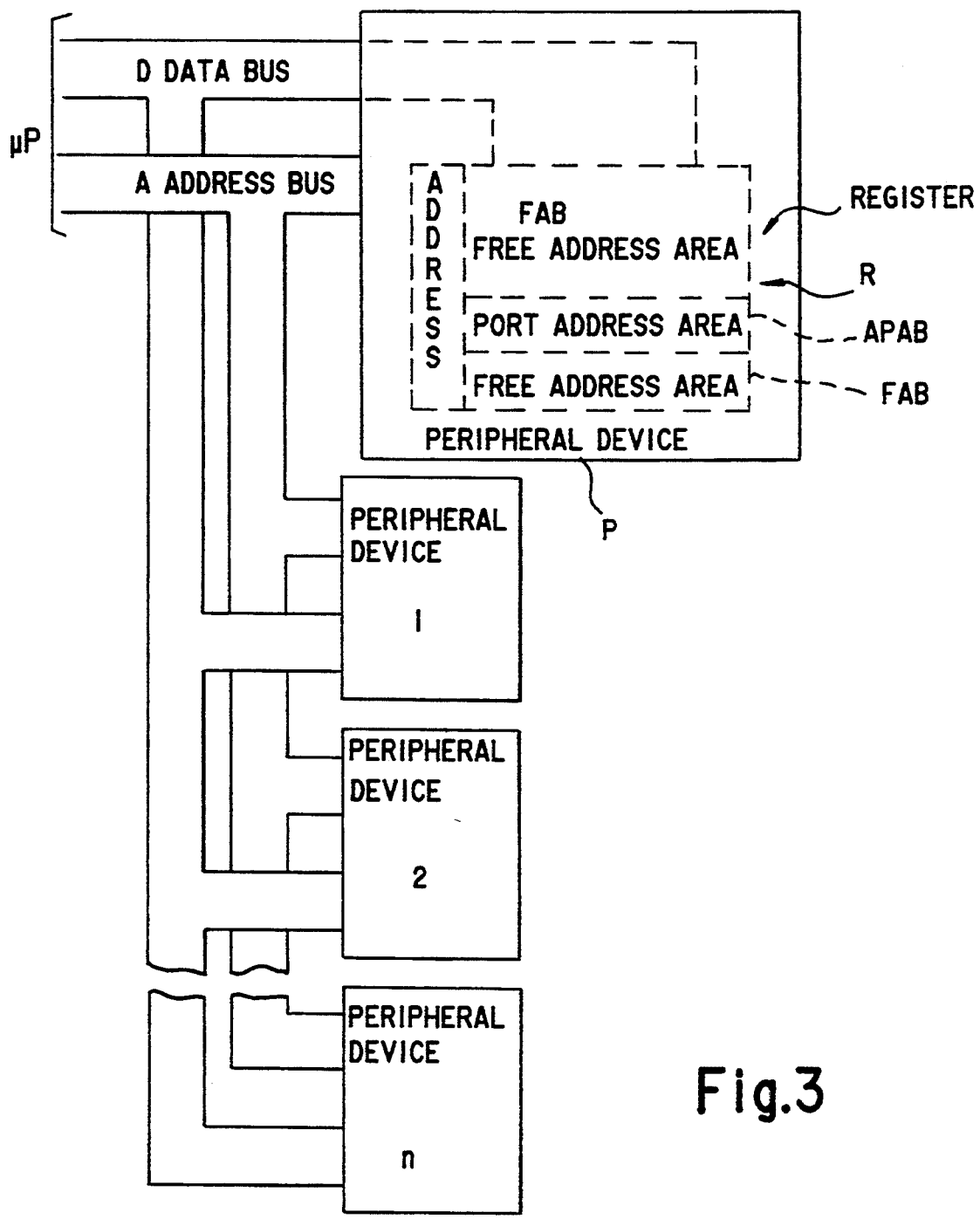
FIG. 3 is a block diagram of a third embodiment of the circuit arrangement according to the invention.

FIG. 3 shows a further embodiment of the circuit arrangement wherein the data bus D and the address bus A are connected to a plurality of peripheral devices 1, 2 to n. Only data of the data bus D can be written to corresponding memories of the peripheral devices 1, 2 to n. The device P shown at the top right-hand side in FIG. 3 has a register R to which information of the data bus D can be written and also read out under corresponding addresses of the address bus A. For this purpose, the register R is subdivided into areas or regions which include a free address area FAB which has the function of a RAM. An equivalent port-address area APAB is further provided which, for the port addresses of the peripheral devices 1, 2 to n, provides the RAM addresses of the device P within the free address area FAB. A corresponding assignment or allocation logic is also provided by means of which a working register and a feedback register are implemented, the corresponding memory location of the feedback register being also simultaneously selected by addressing an address of the working register.

The construction of the circuit arrangement according to the invention not only results in a fast, simply constructed and thus, low-cost circuit arrangement, but also permits a high packing density of the components, i.e. integrated circuits, (ICs) on the printed-circuit board. A high proportion of the components are SMDs (Surface Mounted Devices). The logic device, which ensures the coordination of the working register and the feedback register performs a quasi-timing-management function which, among other things, results in the aforementioned address mirroring. The invention is not restricted to a defined type of microcomputer, but is universally applicable.

It is accordingly possible, for example in the field of printing-press technology, to construct a control and monitoring circuit in accordance with the invention which employs, for example, an 8-bit data word in which the state of each bit ("0" or "1") identifies a specific operating state (e.g. drive on, delivery conveyor on, and the like).

The foregoing is a description corresponding in substance to German Application P 41 14 545.3, dated May 4, 1991, the International priority of which is being claimed for the instant application, and which is hereby made part of this application. Any material discrepancies between the foregoing specification and the aforementioned corresponding German application are to be resolved in favor of the latter.

I claim:

1. Circuit arrangement for operating a computer, having at least one working register into which and out of which information, at specific addresses, can be read, and a readback device for providing feedback in a program step, wherein last-written information is fed back to a processor of the computer, the arrangement comprising at least one feedback register to which said working register is assigned, means for writing said information under the same address into the working register and into the feedback register for storage therein, and means for forwarding the information stored in the feedback register to the processor in order to enable the writing of new information into the feedback register.

2. Circuit arrangement according to claim 1, wherein said feedback register is a random access memory.

3. Circuit arrangement according to claim 2, wherein said random access memory is a part of the computer.

4. Circuit arrangement according to claim 1, including a logic device operative for accessing, through the intermediary of an allocation logic of said logic device, simultaneously said working register and said feedback register at the same address.

5. Circuit arrangement according to claim 4, wherein said logic device is in the form of a discrete hardware circuit.

6. Circuit arrangement according to claim 4, wherein said logic device is a programmable logic device.

7. Circuit arrangement according to claim 1, including at least one peripheral device, said peripheral device having at least one register having a region with only partial readback capability, wherein the working register has a region with no readback capability, and wherein said feedback register is composed of said region with partial readback capability and said region with no readback capability.

8. Circuit arrangement according to claim 7, having means for reading back or not reading back, respectively, an individual data bit or a plurality of data bits.

* * * * *